No. 641,380. Patented Jan. 16, 1900.
O. F. GARVEY.
AUTOMATIC MACHINE CHUCK.
(Application filed Sept. 8, 1899.)
(No Model.)

Witnesses.
M. E. Cleveland
A. L. Makepeace

Inventor.
Owen F. Garvey
By Arnold Barlow
Attorneys

UNITED STATES PATENT OFFICE.

OWEN F. GARVEY, OF PROVIDENCE, RHODE ISLAND, ASSIGNOR TO THE UNITED STATES SAFETY GAS COCK COMPANY, OF SAME PLACE.

AUTOMATIC MACHINE-CHUCK.

SPECIFICATION forming part of Letters Patent No. 641,380, dated January 16, 1900.

Application filed September 8, 1899. Serial No. 729,365. (No model.)

*To all whom it may concern:*

Be it known that I, OWEN F. GARVEY, of Providence, in the county of Providence and State of Rhode Island, have invented certain new and useful Improvements in Automatic Machine-Chucks; and I do hereby declare that the following is a full, clear, and exact description thereof, reference being had to the accompanying drawings, and to the letters of reference marked thereon, which form a part of this specification.

This invention consists in constructing a chuck for holding work in lathes and other machines in such a manner that the article can be operated upon on different sides and in different places on the same side without having to be removed from the chuck and be reset. It is fully explained and illustrated in this specification and the accompanying drawings.

Figure 1:
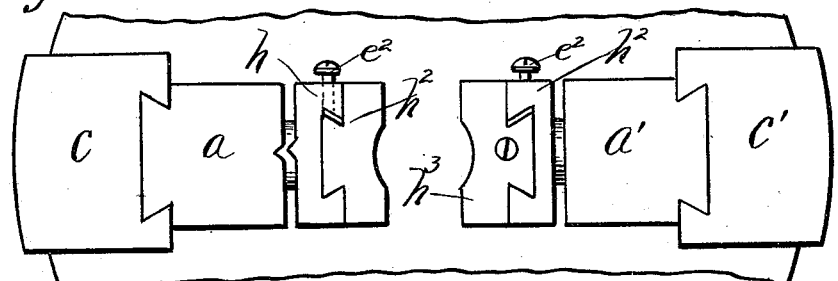
Figure 2:
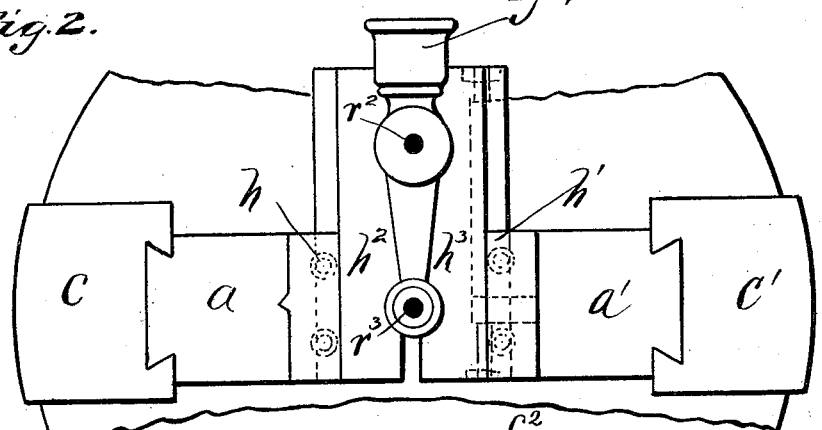
Figure 3:
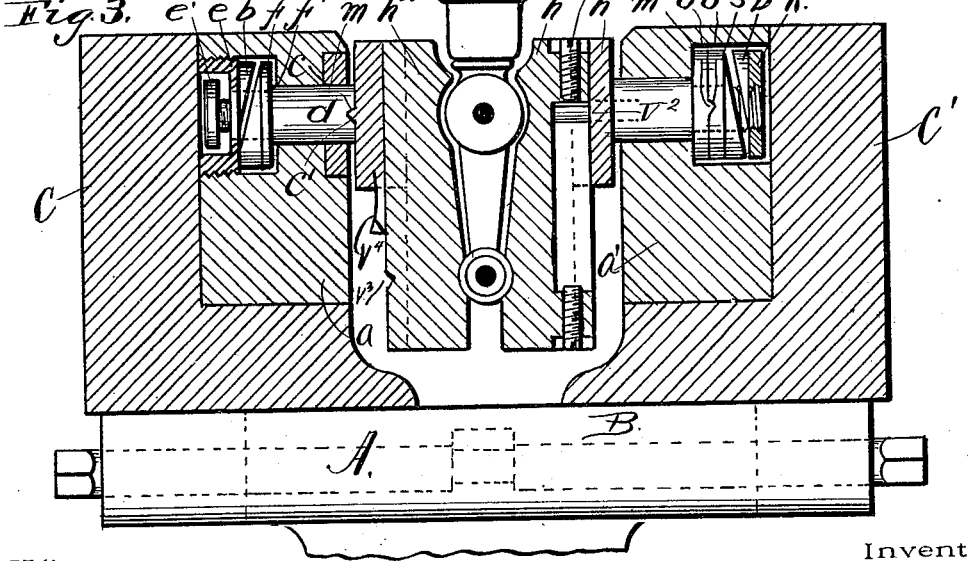

Figure 1 is a front view of a two-jawed universal chuck with the improvement attached. Fig. 2 shows a face view of the chuck, the holding-blocks having made a quarter-turn from the position shown in Fig. 1. Fig. 3 is a side view of chuck with some parts in section.

This invention is an improvement on that described in United States Patent No. 635,243, issued to me October 17, 1899.

The object of the invention is to construct a chuck in such a manner that the piece of work may be slid laterally across the center of the chuck and two or more holes drilled in the same side of it without removing and resetting it in the chuck.

The construction and operation of the improvement are as follows:

In the drawings, A represents a two-jawed chuck, which in its main parts may be made in most any of the usual ways.

C C are the two jaws, and B is the screw that moves the jaws toward or from the center of the chuck, which screw is usually made with a right-hand thread for one jaw and a left-hand thread for the other jaw. A block $a$ is attached to the inner face of one of the jaws. This block $a$ and the inner half of the socket $d$ are bored out larger, as shown in Fig. 3. A cylindrical block $h$ is turned down for the greater part of its length to fit closely in the smaller part of the socket $d$ in the block $a$, and the inner half of the block $h$ is turned down still smaller to receive a spring-washer $b$ and a nut $e$, that is screwed into the inner end of the socket $d$. The nut $e$ is recessed on one side to receive the head of a screw $e'$, that is screwed into the end of the block $a$, and the head of the screw $e'$ is made larger than the hole in the nut $e$ to keep the block $h$ from coming out of the block $a$. A washer $f$ is fitted loosely on the smaller part of the block $h$ to rest on a shoulder $f'$ and convey the pressure of the spring-washer $b$ and push the block $h$ outward. A steel collar $m$ is made fast in the face of the block $a$, and a radial V-shaped ridge $c$ (shown in Fig. 3) is made on the outer face of the collar to receive corresponding-shaped grooves $c'$, made on the shoulder of the block $h$. A similar block $a'$ is dovetailed on the face of the other jaw C', and a like socket $d'$ is made through it to receive a cylindrical block $h'$, which is made to fit closely, as described of block $h$; but in this case a nut $k$ is fitted to screw on the inner end of the block $h'$, and the smaller part of the block between the nut $k$ and the shoulder is made square to receive a steel washer $s$ and a spring-washer $b'$. A steel collar $m'$ is made fast against the shoulder in the block $h'$, and a radial V-shaped ridge $o$ is made on its inner side, and a corresponding groove $o'$ is made in the adjacent face of the washer $s$ to receive the ridges $o$.

The arrangement for moving the piece of work across the face of the chuck that two or more holes may be drilled perfectly parallel with each other is as follows: Dovetailed grooves are made (see Fig. 1) in the faces of the blocks $h$ $h'$, and two blocks $h^2$ $h^3$ are fitted to slide in them, so that the work J', held between the blocks $h$ $h'$, can be moved laterally (as well as turned with the blocks $h$ $h'$) without releasing and resetting it, (see Fig. 2,) in which the work J', after having a hole drilled in it at $r^2$, has, with the blocks $h^2$ $h^3$, been slid to one side to have a hole drilled at $r^3$. The blocks $h^2$ and $h^3$ are provided with the usual gibs and set-screws $e^2$ to make them slide snugly in the dovetailed grooves. In Fig. 13 means are shown to limit the distance that the blocks $h^2$ $h^3$ may slide, so that they will stop at the same place every time when moved either way. They consist in cutting away a portion of the dovetailed groove on the block $h^3$ and putting adjusting-screws $c^2$ $c^2$ in the remaining end portions of the dovetail and placing an adjustable stop $v^2$ in the dovetailed groove in the block $h'$ for the screws $c^2$ to bring up against when moved either way to adjust it. To stop the sliding block at points between the ends, notches $v^3$ are made in the other side of the sliding block $h^2$ and attaching a stop-spring $v^4$ to the block $h$, so that the end of the spring will catch in the notches and determine the point at which the block shall stop, and when the jaws are screwed up there will be no change in the position of the work.

Having thus described my improvements, I claim as my invention and desire to secure by Letters Patent—

1. In a combination-chuck, the combination with the jaws of the chuck, of stationary blocks attached to the faces of the jaws, blocks held to rotate in sockets in said stationary blocks, a spring-washer arranged to bear on one of the rotating blocks and press it out of its socket, a spring-washer arranged to draw the other rotating block into its socket in its plate, dovetailed grooves made in the faces of the rotating blocks, blocks fitted to slide in said dovetailed grooves, substantially as described.

2. In a machine-chuck the combination with the jaws of the chuck, of blocks attached to the faces of the jaws, blocks held to slide across the face of the chuck in grooves in said blocks, a stop placed in the groove in one of said blocks, a portion of one of the sliding blocks that slides in the grooves, cut away to accommodate the stop, set-screws fitted in the end portions not cut away, to bring up against the stop and limit the motion either way, notches made in the other sliding block, a stationary spring-stop arranged to catch in said notches, substantially as described.

In testimony whereof I have hereunto set my hand this 25th day of August, A. D. 1899.

OWEN F. GARVEY.

In presence of—
 BENJ. ARNOLD,
 M. E. CLEVELAND.